United States Patent [19]
Li

[11] Patent Number: 6,020,008
[45] Date of Patent: Feb. 1, 2000

[54] PROLAMINE MISCIBLE BLENDS

[75] Inventor: Weisheng Li, Montclair, N.J.

[73] Assignee: Wm. Wrigley Jr. Company, Chicago, Ill.

[21] Appl. No.: 08/799,872

[22] Filed: Feb. 14, 1997

[51] Int. Cl.⁷ .................................. A23G 3/30; A23J 1/00
[52] U.S. Cl. .................................... 426/3; 426/6; 426/656
[58] Field of Search ...................................... 426/3–6, 656

[56] References Cited

U.S. PATENT DOCUMENTS

| | | |
|---|---|---|
| 2,154,482 | 4/1939 | Weber . |
| 2,489,147 | 11/1949 | Lougovoy . |
| 3,116,206 | 12/1963 | Brynko et al. . |
| 4,433,076 | 2/1984 | Bauer et al. ........................... 523/342 |
| 4,474,749 | 10/1984 | Kruppa . |
| 4,753,790 | 6/1988 | Silva et al. . |
| 4,863,745 | 9/1989 | Zibell . |
| 4,931,295 | 6/1990 | Courtright . |
| 5,112,625 | 5/1992 | Zibell et al. . |
| 5,139,794 | 8/1992 | Patel et al. . |
| 5,324,351 | 6/1994 | Oshlack et al. ........................ 106/153 |
| 5,325,351 | 6/1994 | Uchiyama et al. . |
| 5,342,923 | 8/1994 | Takahashi et al. . |
| 5,367,055 | 11/1994 | Takahashi et al. . |
| 5,409,715 | 4/1995 | Meyers . |
| 5,433,960 | 7/1995 | Meyers . |
| 5,482,722 | 1/1996 | Cook . |
| 5,589,468 | 12/1996 | Lin et al. . |

FOREIGN PATENT DOCUMENTS

| | | |
|---|---|---|
| 30 43 914 A1 | 6/1981 | Germany . |
| 7-16330 | 1/1995 | Japan . |
| WO89/09594 | 10/1989 | WIPO . |
| WO90/06061 | 6/1990 | WIPO . |
| WO90/12512 | 11/1990 | WIPO . |

OTHER PUBLICATIONS

Database Abstract. AN 95 (02):F0005 FSTA for Transactions of the ASAE. 37 (4) pages 1281–1285, Authors: Park et al.; Apri. 1994.

Shukla, Trevene P. "Trends in Zein Research and Utilization," in *Cereal Foods World*, p. 225.

*Primary Examiner*—Anthony J. Weier
*Attorney, Agent, or Firm*—Hill & Simpson

[57] ABSTRACT

A food grade miscible blend of at least one prolamine and at least one polyglycol is provided. Processes for making and using such blends are also provided.

13 Claims, 3 Drawing Sheets

PROLAMINE MISCIBLE BLENDS

BACKGROUND OF THE INVENTION

The present invention relates to prolamine blends. More specifically the present invention relates to food grade biodegradable prolamine blends.

For certain applications prolamines had been used in consumer products. For example, zein is a water-insoluble prolamine (protein) obtained from corn gluten. Zein is a nutritious and readily biodegradable product. Accordingly, zein is a very attractive material for use in food applications.

Additionally zein has been used in industrial applications. In this regard zein has been used in creating packaging, coatings, and adhesives.

However, zein is a very brittle plastic material. Typically, zein will thermally decompose before melting. This property is due to strong hydrogen bonding. Moreover, usually zein is used in the form of either a fine powder or an alcohol/water solution. This creates processing difficulties that limit the applications and uses of zein.

In food products, due to its desirable characteristics, there have been attempts at using zein in products such as chewing gum formulations. In this regard, zein has nutritional and biodegradability properties that are desirable in such products. Further, in an application such as chewing gum the fact that zein becomes brittle after it loses moisture is an advantageous property. This feature eases the removal of zein containing gum cuds from substrates.

A number of patents discuss the use of zein in chewing gum. See, U.S. Pat. Nos. 2,154,482; 2,489,147; 5,482,722; 5,139,794; 3,116,206; 5,112,625; 4,863,745; 4,931,295; 5,367,055; 5,482,722; 4,753,790; 4,474,749; 5,409,715; 5,433,960; and non-U.S. patents and published applications: JP95-163300; German Patent DE3043914A1; PCT WO90/12512; PCT WO90/06061; and PCT WO89/09594. Other patents discussing zein include U.S. Pat. Nos. 5,325,351; 5,367,055; 5,342,923; and 5,324,351. See also: Shukla, "Trends in Zein Research and Utilization", Cereal Foods World, 37(2), 225 (1992).

However, due to processing problems and other issues with the current methods of processing zein the use of zein in chewing gum, as well as other food grade products and industrial applications, has been problematic.

SUMMARY OF THE INVENTION

The present invention provides blends of prolamines, including zein, processes for making the blends, and improved food grade products including prolamines.

To this end, in an embodiment the present invention provides an edible product comprising a miscible blend of at least one prolamine and at least one polyglycol.

In an embodiment, the polyglycol is chosen from the group consisting of poly(ethylene glycol), poly(propylene glycol) and ethylene glycol-propylene glycol copolymers.

In an embodiment, the polyglycol has a molecular weight of from approximately 200 g/mol to about 200,000 g/mol.

In an embodiment, the prolamine comprises at least 5%, by weight, of the blend.

In another embodiment of the present invention a food grade product is provided comprising a blend of zein and a polyglycol chosen from the group consisting of poly(ethylene glycol), poly(propylene glycol) and ethylene glycol—propylene glycol copolymers.

In an embodiment the prolamine comprises up to 95%, by weight, of the blend.

In an embodiment, the polyglycol comprises at least 5%, by weight, of the blend.

In an embodiment, the polyglycol includes ethylene glycol-propylene glycol having block copolymers.

In an embodiment, the polyglycol includes ethylene glycol-propylene glycol having grafting copolymers.

In an embodiment, the polyglycol is poly(ethylene glycol) having a molecular weight of approximately 300 g/mol to about 3350 g/mol.

In still another embodiment of the present invention a process is provided for making a food grade product comprising the steps of: dissolving a prolamine in an alcohol/water mixture; adding polyglycol to the prolamine and alcohol mixture; and heating the prolamine, alcohol and polyglycol to create a miscible blend.

In yet a further embodiment of the present invention a process is provided for making a food grade product comprising the steps of: dissolving a prolamine in an alcohol/water mixture; adding polyglycol to the prolamine and alcohol mixture to a polyglycol; heating the prolamine, alcohol and polyglycol to create a miscible blend; and adding the miscible blend to other food grade ingredients to make a food grade product.

An advantage of the present invention is to provide a more usable form of prolamine.

Another advantage of the present invention is to provide a more usable form of zein.

Still further an advantage of the present invention is to provide an improved method for incorporating a prolamine, such as zein, in a food grade product.

Moreover an advantage of the present invention is to provide an improved food grade product that includes zein.

Further, an advantage of the present invention is to provide an improved process for making blends including prolamine.

Yet another advantage of the present invention is to provide a prolamine containing blend that can be altered over a wide range of properties, from a tacky state to a brittle state, through the manipulation of one of the components of the blend.

Still further, an advantage of the present invention is to provide an improved chewing gum product including zein.

Another advantage of the present invention is to provide an improved food grade product including zein.

These and other advantages and features of the present invention will be apparent from the detailed description of the presently preferred embodiments and the drawings.

DETAILED DESCRIPTION OF THE PRESENTLY PREFERRED EMBODIMENTS

Figure 1:
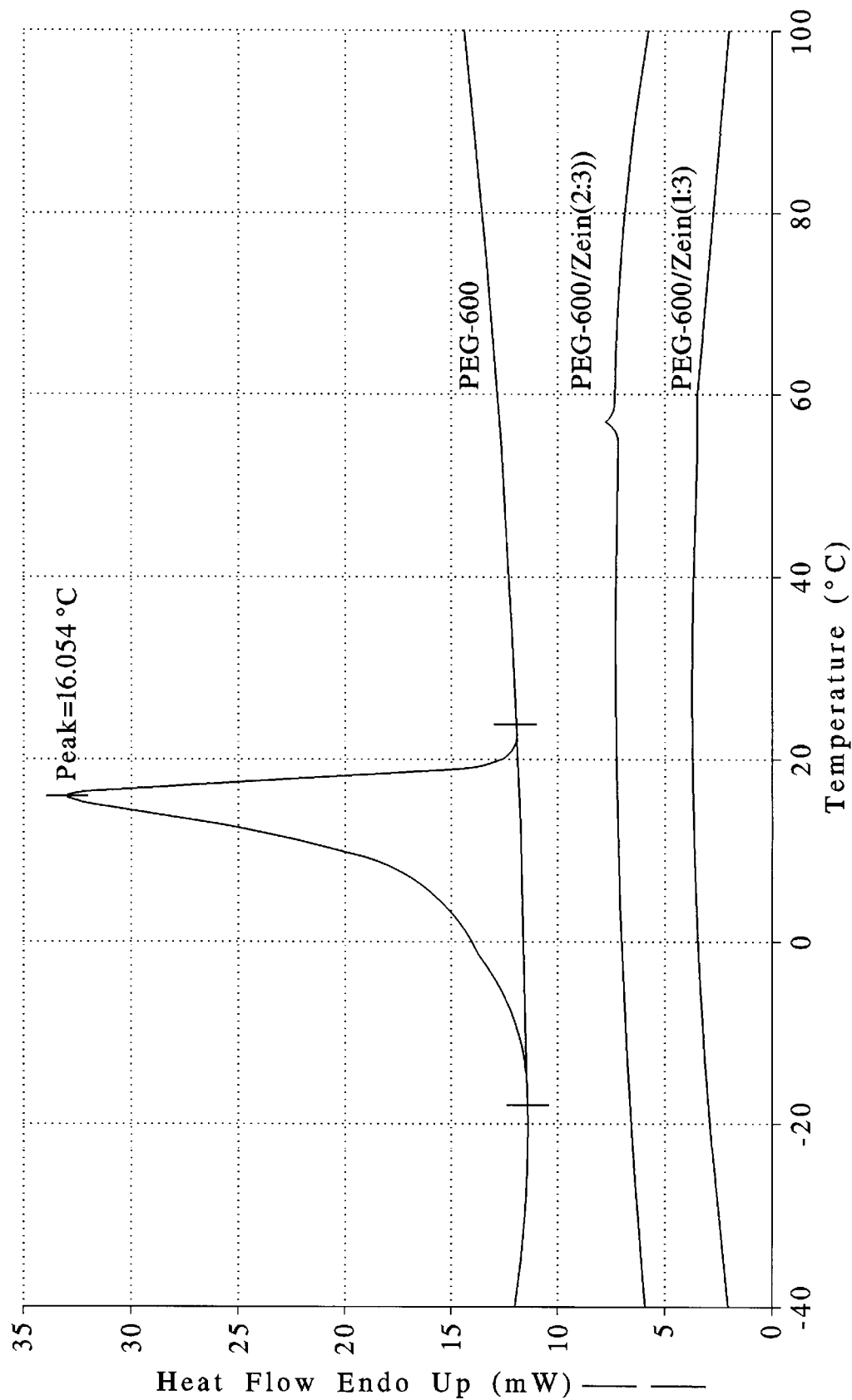
FIG. 1 illustrates graphically DSC thermograms of blends of zein and PEG-600.

The present invention relates to improved blends of prolamine, process for making same, and products made therefrom. Pursuant to the present invention miscible blends of prolamine, for example zein, are made.

Surprisingly it has been found that prolamines, such as zein, form miscible blends of mixtures with polyglycols when processed under certain conditions. These blends, unlike for example the zein product itself, are thermally processable. They become very soft, even melting, before decomposition. This allows the blends to be easily incorporated into biodegradable adhesives, chewing gum, gum bases, or any other non-solution products such as food grade products.

The blends remain biodegradable and of a food additive grade. However, they also possess thermal processability due to the plasticization of the polyglycol.

Further, surprisingly it has been found that the mechanical properties of the blends can be altered over a wide range. This range extends from a tacky state to a brittle state. The manipulation can be achieved through a change of either the polyglycol content or the molecular weight of the polyglycol.

Pursuant to the present invention a variety of prolamines can be used. Such prolamines include zein, gliadin, and hordein.

Pursuant to the present invention a variety of polyglycols can be used. Such polyglycols include poly(ethylene glycol), poly(propylene glycol), and ethylene glycol-propylene glycol copolymers. In the ethylene glycol-propylene glycol copolymers, the ethylene glycol contents can range from 0 to 100% block, random, or grafting copolymers.

The molecular weight of the polyglycol can vary over a wide range. For example, the molecular weights can vary from 200 to 200,000. Preferably 200 to 8000 for poly (ethylene glycol). More preferably the molecular weight varies from 600 to 3,350.

In the blend the zein can comprise 1 to about 99% of the product. Preferably zein comprises 40% to about 95% of the blend. The polyglycol can comprise approximately 1 to about 99% of the blend. Preferably the polyglycol can comprise approximately 5% to about 60% of the blend.

The amount of polyglycol and/or the molecular weight of the polyglycol affects the mechanical properties of the blend (e.g., tack) and the miscibility. It has been found that as molecular weight decreases miscibility with zein increases.

Pursuant to the present invention, processes of making miscible prolamine blends are provided. Generally, pursuant to the process, prolamine is dissolved in alcohol/water mixtures. A variety of alcohols can be used including low and high molecular weight linear or branched alcohols. Such alcohols can be chosen from a group consisting of methanol, ethanol, propanol, and butanol.

Then a polyglycol is added to the prolamine and alcohol mixture. This mixture is then heated to create a miscible blend.

By way of example, an example of the process is as follows. 20 grams of isopropyl alcohol (20:80 alcohol:water) and 60 grams of zein are mixed. The mixing takes place using a slow agitation. To this mixture is added 40 grams, 400 molecular weight polyethylene glycol. Polyethylene glycol is then mixed with the alcohol and zein for 30 minutes. The resultant product is then heated to 50° C. and vacuumed to remove the water and alcohol.

Zein, for example is normally extracted from corn with water-alcohols (ethanol or isopropanol) mixtures. Then the zein is spray dried to powder form. Polyglycols such as poly(ethylene glycol) are also soluble in such water-alcohol mixtures. Thus, the blending process can be incorporated into the normal production of zein.

The end product, prolamine blend, will have a solid form, e.g., powder, pellet, or slates. If desired the blend may be put in solution with alcohol.

By way of further example and not limitation examples of the present invention will now be given:

EXAMPLE 1

To a small plastograph gum base mixer (Brabender Corp., Rochelle Park, N.J.), 60 g zein (Freeman Industries, Inc., regular grade) was added. 20 g 88% isopropanol (12% water) was then slowly added during agitation. The mixture became pasty and near-transparent.

Then 40 g PEG-400 (Union Carbide Corporation, FCC grade) was added. The mixture became more transparent.

After 30 minutes of further mixing, the mixture was heated to 50° C. The mixture was then vacuumed to remove water and isopropanol. The mixture was then discharged. The mixture was transparent having a light yellowish color.

EXAMPLE 2

PEG-400 was replaced with PEG-600 in example 1.

EXAMPLE 3

PEG-400 was replaced with PEG-1000 in example 1.

EXAMPLE 4

PEG-400 was replaced with PEG-3350 in example 1. Temperature was increased to 70° C.

EXAMPLE 5

PEG-400 was replaced with PEG-8000 in example 1. Temperature was increased to 70° C.

EXAMPLE 6

The zein/PEG-8000 ratio was increased to 75/25 in example 5.

EXAMPLE 7

The zein/PEG-8000 ratio was increased to 95/5 in example 5.

EXAMPLE 8

The zein/PEG-600 ratio was increased to 75/25 in example 2.

EXAMPLE 9

The zein/PEG-600 ratio was increased to 90/10 in example 2.

EXAMPLE 10

The zein/PEG-600 ratio was increased to 95/5 in example 2.

EXAMPLE 11

Ethanol/water (8:2) was replaced for the isopropanol/water mixture in example 2. Still a transparent yellowish mixture was obtained.

Evaluation Of Blend Compatibility

The compatibility of two polymers can be judged by visual appearance and differential scanning calorimeter (DSC). This is the typically used method. A compatible amorphous mixture normally is clear while an incompatible mixture is cloudy. On a DSC curve, a compatible mixture exhibits single glass transition temperature (Tg) or depressed melting points (Tm). The Tg and Tm of the mixture can also be estimated from the following equations.

$$\frac{1}{T_{g,b}} = \frac{w_1}{T_{g,1}} + \frac{w_2}{T_{g,2}}$$

$$\frac{1}{T_m} - \frac{1}{T^\circ_m} = -\frac{RV_{2u}}{\Delta H_{2u} V_{1u}} \chi_{12}(1-\phi_2)^2$$

Because PEG is highly crystalline, a depression of its melting point can be used as evidence of compatibility. This is due to its interaction with zein.

Table 1, below, summarizes the visual results for zein/PEG blends.

TABLE 1

Appearance and Compatibility of Zein/PEG Blends

| Code | wt % of Zein | wt % of PEG | PEG MW (g/mol) | Appearance | Toughness |
|---|---|---|---|---|---|
| 1.00 | 60.00 | 40.00 | 400.00 | Clear | Soft |
| 2.00 | 60.00 | 40.00 | 600.00 | Clear | Tough |
| 3.00 | 60.00 | 40.00 | 1000.00 | Sl. Cloudy | Tough |
| 4.00 | 60.00 | 40.00 | 3350.00 | Cloudy | Brittle |
| 5.00 | 60.00 | 40.00 | 8000.00 | Cloudy | Brittle |
| 6.00 | 75.00 | 25.00 | 8000.00 | Sl. Cloudy | Brittle |
| 7.00 | 95.00 | 5.00 | 8000.00 | Sl. Cloudy | Brittle |
| 8.00 | 75.00 | 25.00 | 600.00 | Clear | Tough |
| 9.00 | 90.00 | 10.00 | 600.00 | Clear | Brittle |
| 10.00 | 95.00 | 5.00 | 600.00 | Clear | Brittle |
| control | 100.00 | 0.00 |  | Clear | Very Brittle |

DSC measurements were conducted on a Perkin-Elmer DSC-7 using a heating rate of 15° C./min. FIG. 1 graphically represents DSC curves of PEG-600 and blends with zein. As can be seen, after blending with zein, the crystalline structures of PEG-600 were completely destroyed. This means the two components (zein and PEG) formed miscible mixtures at a molecular level.

Figure 2:
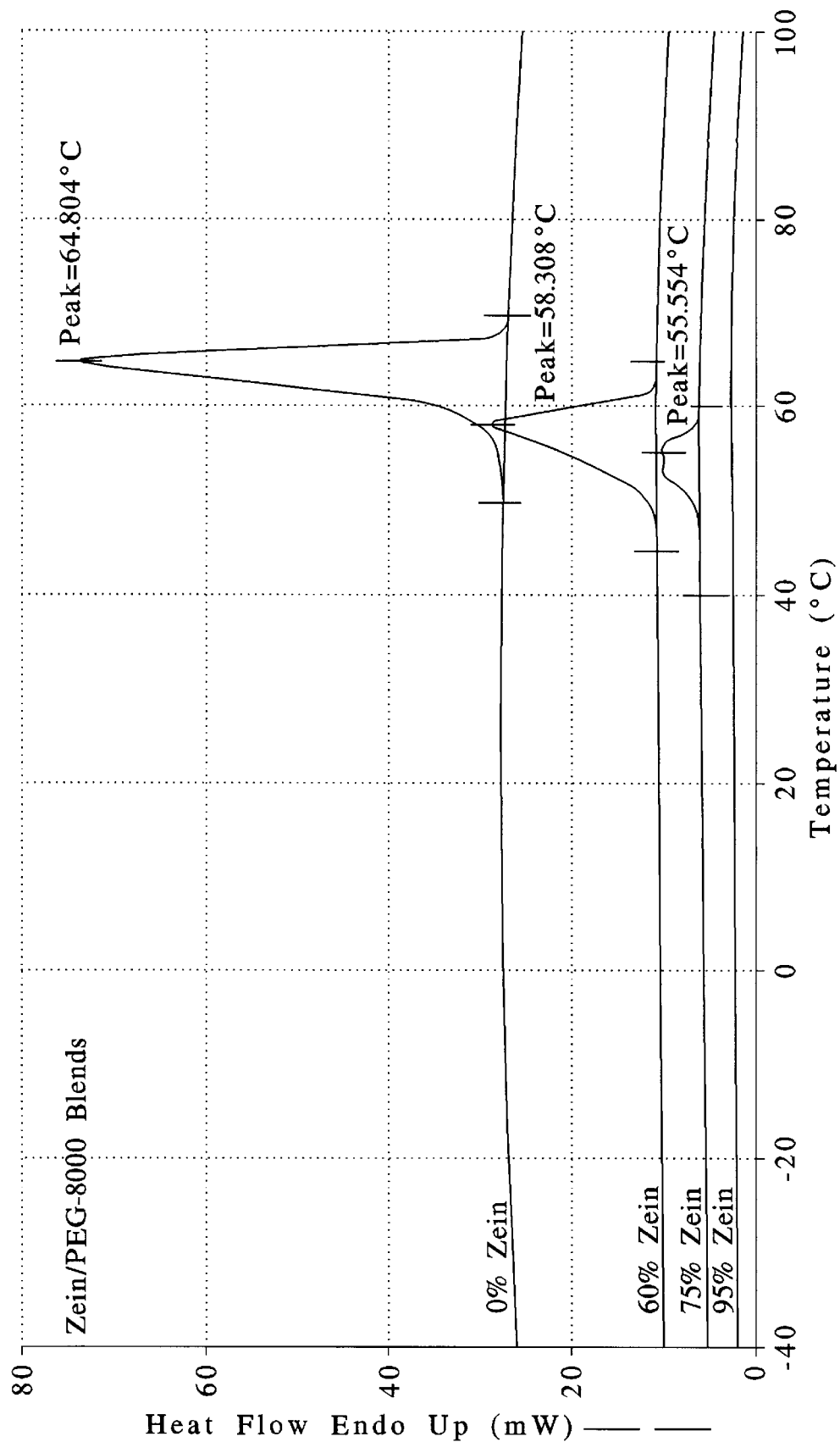
FIG. 2 illustrates graphically DSC thermograms of blends of zein and PEG-8000.

Similarly, FIG. 2 illustrates the blends of zein with PEG-8000. After blending 60% zein with 40% PEG-8000, the melting point of PEG depressed from an initial point of 64.8° C. to 58.3° C. The depression continued with the increase of the zein content of the blend, and eventually disappeared when zein reached 95% of the blend. These results indicate that even high molecular PEG-8000 has strong interactions with zein and formed compatible mixtures.

Although these blends are miscible or compatible at room temperature, it was determined, however, they may undergo phase separation when the temperature is sufficiently high.

Figure 3:
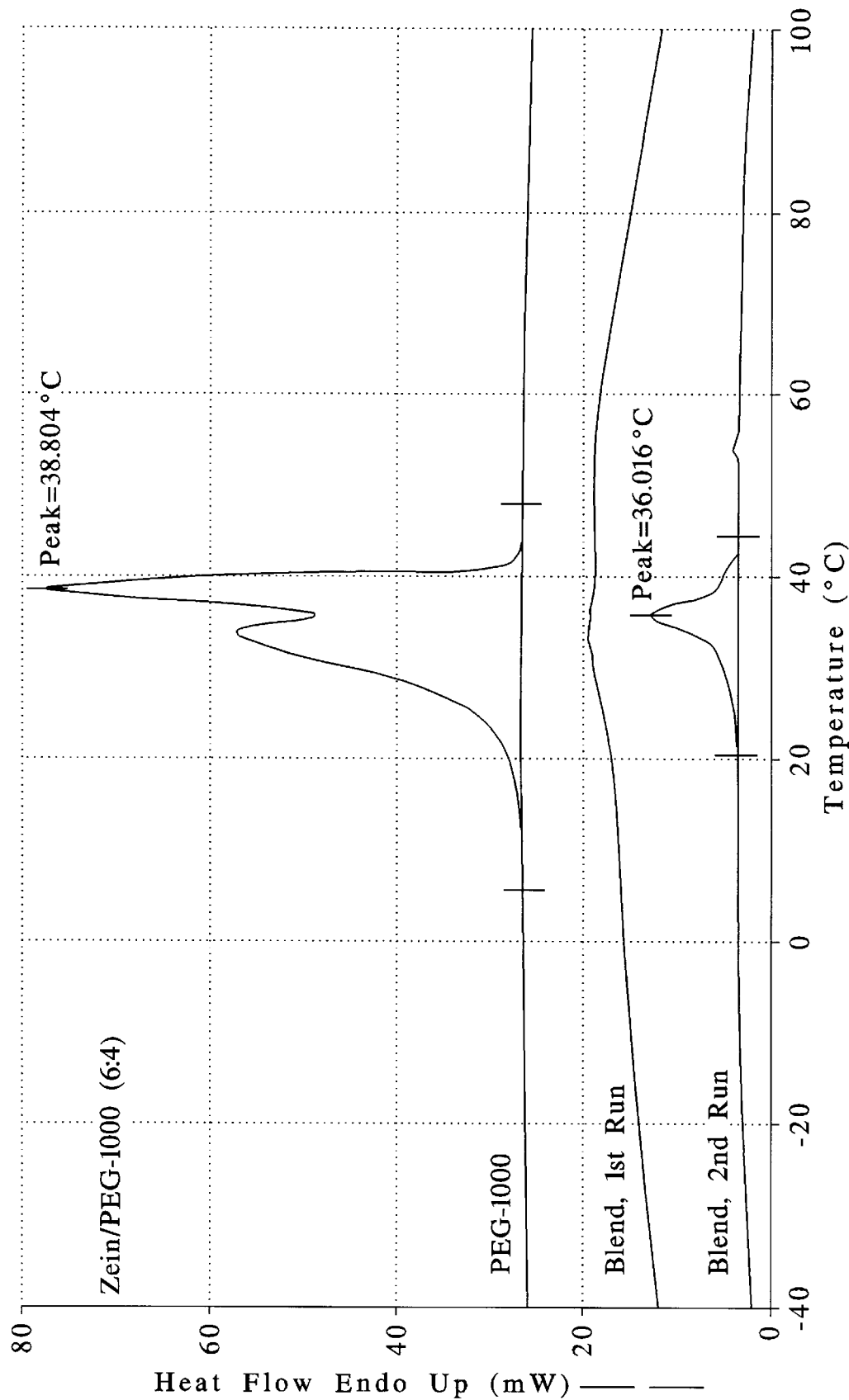
FIG. 3 illustrates graphically phase separation of zein/PEG-1000 (6:4) blends upon heating to 100° C.

FIG. 3 is such an example. In FIG. 3, the top curve is pure PEG-1000, the second curve is the first scan of the blend with 60% zein, and the third curve is a re-scan after the blend was heated to 100° C. As can be seen, the fresh blend (middle curve) did not show any PEG melting peak. The heat-treated blend (bottom curve), however, clearly shows a melting peak corresponding to that of pure PEG-1000.

Table 2 summarizes the DSC results and phase structures.

TABLE 2

DSC Melting Points and Compatibility of Zein/PEG Blends

| Code | wt % of Zein | wt % of PEG | PEG MW (g/mol) | $T_m$ (° C.) | Phase Structure |
|---|---|---|---|---|---|
| Control 1 | 0.00 | 100.00 | 400.00 | 4.50 |  |
| 1.00 | 60.00 | 40.00 | 400.00 | None | Single |
| Control 2 | 0.00 | 100.00 | 600.00 | 16.10 |  |
| 2.00 | 60.00 | 40.00 | 600.00 | None | Single |
| 8.00 | 75.00 | 25.00 | 600.00 | None | Single |
| 9.00 | 90.00 | 10.00 | 600.00 | None | Single |
| 10.00 | 95.00 | 5.00 | 600.00 | None | Single |
| Control 3 | 0.00 | 100.00 | 1000.00 | 38.80 |  |
| 3.00 | 60.00 | 40.00 | 1000.00 | None | Single |
| Control 4 | 0.00 | 100.00 | 3350.00 | 61.40 |  |
| 4.00 | 60.00 | 40.00 | 3350.00 | 58.30 | Separate |
| Control 5 | 0.00 | 100.00 | 8000.00 | 64.80 |  |
| 5.00 | 60.00 | 40.00 | 8000.00 | 58.30 | Separate |
| 6.00 | 75.00 | 25.00 | 8000.00 | 55.60 | Separate |
| 7.00 | 95.00 | 5.00 | 8000.00 | None | Single |
| Control | 100.00 | 0.00 |  | None |  |

It will be understood that various modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

I claim:

1. An edible product comprising:
   a miscible blend of at least one prolamine and at least one polyglycol, the polyglycol having a molecular weight of at least approximately 600 g/mol.

2. The edible product of claim 1 wherein the prolamine is zein.

3. The edible product of claim 1 wherein the polyglycol is chosen from the group consisting of poly(ethylene glycol), poly(propylene glycol) and ethylene glycol-propylene glycol copolymers.

4. The edible product of claim 1 wherein the polyglycol has a molecular weight of from approximately 200 g/mol to about 600,000 g/mol.

5. The edible product of claim 1 wherein the prolamine comprises 40% to about 95%, by weight, of the blend.

6. The edible product of claim 1 wherein the polyglycol comprises at least 1%, by weight, of the blend.

7. A food grade product comprising a blend of zein and a polyglycol chosen from the group consisting of poly(ethylene glycol), poly(propylene glycol) and ethylene glycol—propylene glycol copolymers, the polyglycol having a molecular weight of at least approximately 600 g/mol.

8. The food grade product of claim 7 wherein the polyglycol has a molecular weight of from approximately 200 g/mol to about 600,000 g/mol.

9. The food grade product of claim 7 wherein the prolamine comprises 40% to about 95%, by weight, of the blend.

10. The food grade product of claim 7 wherein the polyglycol comprises at least 1%, by weight, of the blend.

11. The food grade product of claim 7 wherein the polyglycol is ethylene glycol-propylene glycol including block copolymers.

12. The food grade product of claim 7 wherein the polyglycol is poly(ethylene glycol) having a molecular weight of approximately 600 g/mol to about 3350 g/mol.

13. The food grade product of claim 1 wherein the polyglycol is poly(ethylene glycol) having a molecular weight of approximately 600 g/mol to about 3350 g/mol.

* * * * *